April 19, 1949.  W. VAN DEN BURG  2,467,510
ROD PACKING
Filed Aug. 8, 1947
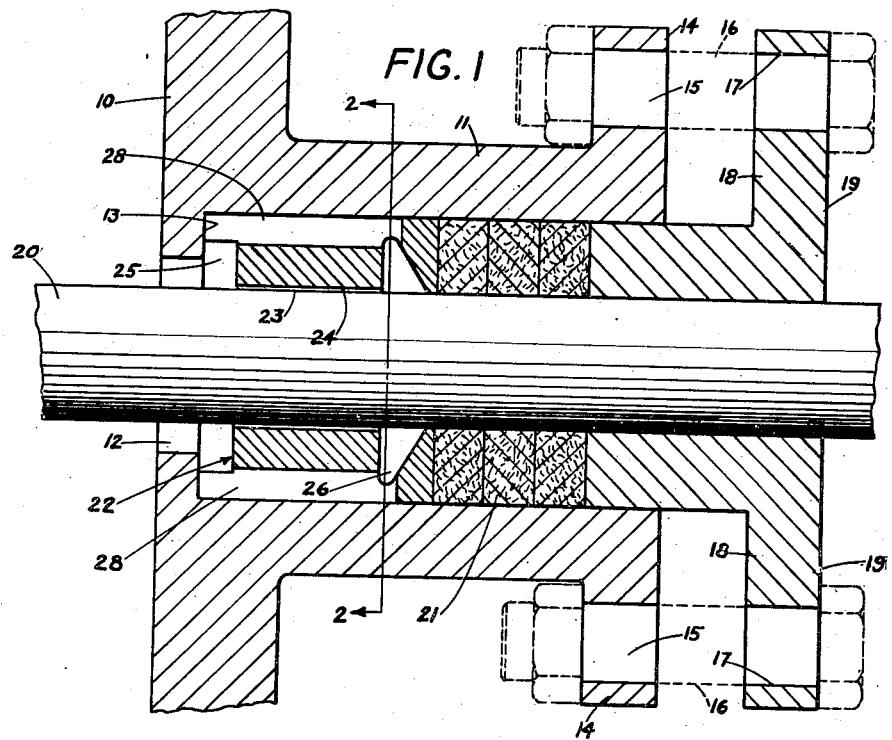
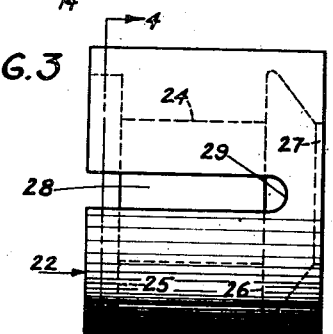
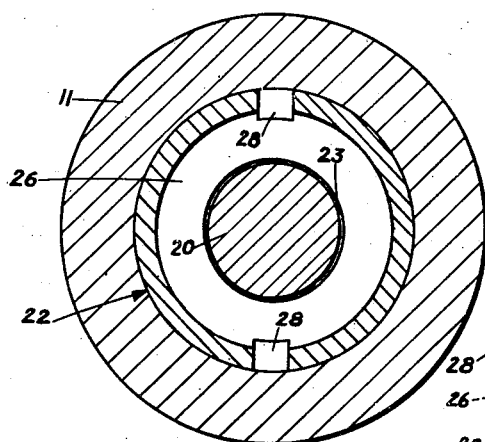
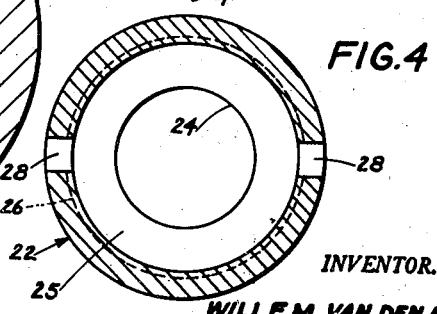
INVENTOR.
WILLEM VAN DEN BURG
BY McMorrow, Berman & Davidson
Attorneys

UNITED STATES PATENT OFFICE 2,467,510

ROD PACKING

Willem Van den Burg, Kuils River,
Union of South Africa

Application August 8, 1947, Serial No. 767,574

3 Claims. (Cl. 308—36.1)

This invention relates to improvements in rod or shaft packing, and more particularly to an improved packing for a reciprocating rod or shaft such as a pump piston rod.

The improved packing device is intended to surround a reciprocating rod or shaft and to be disposed in a conventional stuffing box in operative association with conventional packing material and takes the place of the conventional bearing bushing usually disposed between the inner-end of the stuffing box and the packing material compressed in the outer-end portion of the box by the packing gland.

In the conventional arrangement, as the rod moves out of the associated cylinder through the stuffing box, fluid on the surface of the rod is wiped off by the packing material and has to be forced through the narrow clearance between the rod and the bearing bushing back into the cylinder. This fluid may be a lubricant or may be fluid material handled by a reciprocating pump, the invention being particularly useful in pumps handling crude petroleum or petroleum products.

Because of the difficulty in forcing the fluid from the packing material back into the cylinder, it is necessary to maintain the packing material under heavy pressure resulting in unduly rapid wear of the rod and the packing material and the waste of power because of the excessive friction in the packing joint. When the fluid is heavy or viscuous it frequently becomes impossible to force it back into the cylinder through the bearing bushing clearance in which case it accumulates under high pressure in the packing material, causing rapid destruction of the packing material and uncontrollable leakage of the stuffing box.

It is among the objects of the present invention to provide an improved bearing bushing constructed and arranged to facilitate the return of fluid from the stuffing box packing to the cylinder of a reciprocating pump or engine, which bushing may be substituted for the conventional bearing bushing without any modification of the stuffing box or associated piston rod, which provides adequate bearing surface for the piston rod and has sufficient strength to safely withstand the pressure applied to the associated packing material to compress the same around the piston rod, enables the packing material to provide a fluid-tight seal around the piston rod with only moderate pressure thereon, may be formed of the same materials as conventional bearing bushings used for the same or similar purposes, is simple in construction and economical to manufacture.

Other objects and advantages will become apparent from a consideration of the following description in conjunction with the accompanying drawing, wherein:

Figure 1 is a longitudinal cross-section through a stuffing box showing the application thereto of a bearing bushing illustrative of the invention;

Figure 2 is a transverse cross-section on the line 2—2 of Figure 1;

Figure 3 is an elevation of the improved bearing bushing; and

Figure 4 is a transverse cross-section on the line 4—4 of Figure 3.

With continued reference to the drawing, there is shown in Figure 1 a cylinder end wall 10 having on the outer side thereof a hollow, cylindrical boss or extension 11 which provides a cylindrical stuffing box communicating with the interior of the cylinder through a circular aperture 12 at the inner end of the stuffing box. The interior of the stuffing box is counterbored to provide, at the inner end thereof, an annular shoulder 13 surrounding the aperture 12 and spaced from the inner surface of the cylinder head a distance to provide sufficient metal between the shoulder and the interior surface of the cylinder head to support the load imposed upon the shoulder by the bearing and packing unit in the stuffing box. At its outer end the stuffing box 11 is provided with an outwardly-extending annular flange 14 having angularly-spaced apertures 15 therein to receive the inner ends of bolts 16 which also pass through angularly-spaced apertures 17 provided in the outwardly-extending annular flange 18 of a packing gland 19 received in the outer end of the bore of the stuffing box 11.

A piston rod 20 extends through the stuffing box 11 and through a central bore or aperture in the packing gland 19 and is reciprocable therein. A resilient fibrous packing material 21 surrounds the shaft 20 within the stuffing box 11 at the inner end of the packing gland 19 and a bearing bushing, generally indicated at 22, surrounds the shaft within the stuffing box between the packing material 21 and the shoulder 13 at the inner end of the stuffing box.

With the exception of the improved bearing bushing, the stuffing box assembly, so far described, is entirely conventional and constitutes no part of the present invention, except in the combination thereof with the improved bearing bushing.

As is clearly apparent from Figure 1, as the rod 20 slides outwardly through the stuffing box the packing material 21 will wipe any fluid adhering to the surface of the rod from the rod, which fluid will tend to collect at the juncture of the packing material and the adjacent end of the bearing bushing. With a conventional bearing bushing this fluid material must pass through the narrow clearance, as illustrated in somewhat exaggerated form at 23, to return to the cylinder. As explained above, this necessitates the application of unnecessarily large compression forces to the packing material to prevent leakage and, in the case of heavy or viscous liquids which cannot be returned through the clearance 23, results in uncontrollable leakage of the stuffing box and rapid deterioration of the packing material. These difficulties are overcome by the provision of the improved bearing bushing 22.

The bearing bushing 22 is a cylindrical body of suitable bearing material which may, if desired, be the same as that used for conventional bearing bushings, and has an axial bore 24 therethrough for the rod 20, the bore 24 having a normally close fit with the surface of the rod 20.

At one end the bushing 22 is provided with a counterbore 25 concentric with the bore 24 and opening to the corresponding end of the bushing. In its opposite end portion the bushing is provided with an internal annular groove 26, the inner wall of which is substantially perpendicular to the longitudinal center-line of the bushing and the outer wall of which is frusto-conical in shape so that the groove has a tapered cross-sectional shape with a wide inner edge opening into the bore 24 and a narrow outer edge formed by a curved fillet between the inner and outer walls of the annular groove. The outer, frusto-conical wall of the groove 26 intersects the bore 24 a short distance from the outer end wall of the bushing to provide a narrow annular lip 27 surrounding the shaft 20 at the outer end of the bushing. The taper of the outer wall of the groove and the distance between this outer wall and the outer end wall of the bushing is such that this outer end portion of the bushing has adequate strength to resist the pressure applied to the packing material 21, since the bushing constitutes one abutment for compressing the packing material and is opposed to the inner end of the packing gland 19 so that the packing material can be compressed between the bearing bushing and the packing gland. The end walls of the bearing bushing are substantially perpendicular to the longitudinal center-line of the bushing so that the compressive forces applied to the packing material will be evenly transferred to the internal annular shoulder 13, which resists the force applied to the packing gland 19 by the bolts 16.

A pair of longitudinally-extending grooves 28 are provided in the outer surface of the cylindrical body of the bearing bushing 22 and extend from a location near the outer end of the bushing to the inner end thereof. At their outer ends the grooves 28 are preferably curved, as indicated at 29, and are in communication with the internal annular groove 26 at the outer periphery of this groove, as is clearly illustrated in Figure 1. At their opposite ends the longitudinal grooves 28 are in communication with the counterbore 25. With this arrangement, any fluid wiped off of the shaft 20 by the packing material 21 is received into the annular internal groove 26 and passes from this groove through the longitudinal grooves 28 to the counterbore 25 from which it is returned to the cylinder through the aperture 12. While a pair of oppositely-disposed longitudinal grooves 28 has been illustrated, it is to be understood that these grooves may vary in number and arrangement as may be found convenient or desirable. The size and shape of the internal annular groove 26 may also be varied without, in any way, exceeding the scope of the invention. The lip 27 which is interposed between the internal annular groove 26 and the packing material 21, is so narrow as to constitute no material obstruction to the passage of fluid from the packing material into the groove, and if found necessary or desirable, may be circumferentially relieved to provide adequate clearance between itself and the shaft 20 to permit the free passage of heavy or viscous fluid into the groove 26.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A bearing bushing receivable in a stuffing box to slidably support a piston rod in said stuffing box and support a body of packing material surrounding said rod at the outer end of said bushing, said bushing comprising a cylindrical body of bearing material having a rod-receiving bore therethrough, a counterbore at one end of said bore, a beveled, internal, annular groove near the opposite end of said bore opening at its inner circumference into said bore, and a longitudinal groove in the outer surface of said body communicating at one end with said counterbore and at its opposite end with said annular, internal groove and terminating short of the corresponding end of said body.

2. A bearing bushing receivable in a stuffing box to slidably support a piston rod in said stuffing box and support a body of packing material surrounding said rod at the outer end of said bushing, said bushing comprising a cylindrical body of bearing material having a rod-receiving bore therethrough, a counterbore at one end of said bore, a beveled, internal annular groove near the opposite end of said bore opening at its inner circumference into said bore, and a longitudinal groove in the outer surface of said body communicating at one end with said counterbore and at its opposite end with said annular, internal groove and terminating short of the corresponding end of said body, said internal annular groove providing at the corresponding end of said body an annular internal lip having a thin inner edge and increasing uniformly in thickness outwardly from said inner edge.

3. A bearing bushing receivable in a stuffing box to slidably support a piston rod in said stuffing box and support a body of packing material surrounding said rod at the outer end of said bushing, said bushing comprising a cylindrical body of bearing material having end walls perpendicular to the longitudinal center-line thereof and a rod-receiving bore therethrough, a counterbore at one end of said bore, a beveled internal, annular groove near the opposite end of said bore opening at its inner circumference into said bore, and a longitudinal groove in the outer surface of said body communicating at one end with said counterbore and at its opposite end with said internal, annular groove and terminating short of the corresponding end of said body, said internal, annular groove having a frusto-conical outer wall providing at the corresponding end of said body an internal lip having a thin inner edge and an outer wall coinciding with the corresponding end wall of said cylindrical body.

WILLEM VAN DEN BURG.

REFERENCES CITED

The following references are of record in the file of this patent:

UNITED STATES PATENTS

| Number | Name | Date |
|---|---|---|
| 296,554 | Godfrey | Apr. 8, 1884 |
| 1,879,774 | Temple | Sept. 27, 1932 |
| 2,105,976 | Langlois | Jan. 18, 1938 |
| 2,428,411 | Davis | Oct. 7, 1947 |